C. A. HOLMES.
RUBBER DAM HOLDER.
APPLICATION FILED MAR. 15, 1916.
1,207,756.
Patented Dec. 12, 1916.
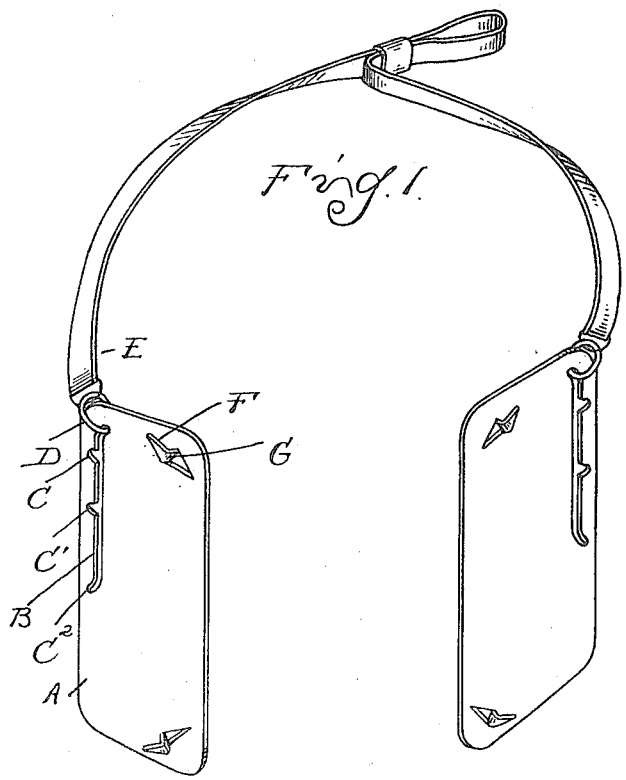
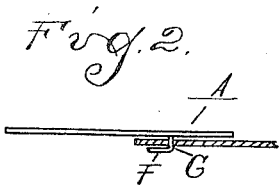
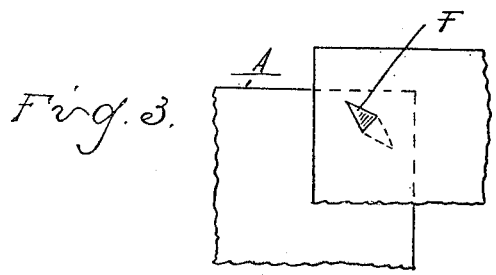
Inventor
Clarence A. Holmes
By Whittemore Hulbert & Whittemore
Attorney

UNITED STATES PATENT OFFICE.

CLARENCE A. HOLMES, OF SEATTLE, WASHINGTON, ASSIGNOR TO DETROIT DENTAL MANUFACTURING COMPANY, OF DETROIT, MICHIGAN, A CORPORATION OF MICHIGAN.

RUBBER-DAM HOLDER.

1,207,756.

Specification of Letters Patent.   Patented Dec. 12, 1916.

Application filed March 15, 1916.   Serial No. 84,456.

*To all whom it may concern:*

Be it known that I, CLARENCE A. HOLMES, a citizen of the United States of America, residing at Seattle, in the county of King and State of Washington, have invented certain new and useful Improvements in Rubber-Dam Holders, of which the following is a specification, reference being had therein to the accompanying drawings.

The invention relates to rubber dam holders designed for use in dentistry, and it is the object of the invention to obtain a simple and inexpensive construction which is readily engaged with the rubber dam and will securely hold the same.

To this end the invention comprises the construction as hereinafter set forth.

In the drawings: Figure 1 is a perspective view of the device; Fig. 2 is an end elevation thereof showing the rubber dam in engagement therewith; and Fig. 3 is a side elevation.

A are cheek-plates preferably formed from sheet-metal, such for instance as aluminum, and being of substantially oblong rectangular form with rounded corners. Parallel to one edge of this cheek-plate there is formed therein a longitudinal slot B having a series of notches C C' C² therein for adjustably engaging a ring D attached to the securing strap E. At the opposite side of the plate and near the corners thereof are struck-out prongs F, which are preferably inclined in opposite directions and return-bent. These pointed prongs are readily engaged with the rubber dam by perforating the same and the return-bends G will then hold the rubber as shown in Fig. 3.

From the above description it will be understood that my improved dam holder may be very cheaply manufactured, and in use forms a convenient securing device for the dam.

What I claim as my invention is:—

1. In a dental dam holder, a cheek-plate having a struck-out and return-bent prong for engaging the dam.

2. In a dental dam holder, a cheek-plate having a plurality of struck-out prongs within the perimeter thereof for engaging the dam and extending at angles to each other.

3. In a dental dam holder, a cheek-plate having a slot parallel to one edge thereof, and a plurality of struck-out prongs at opposite corners thereof and within the perimeter for engaging the rubber dam, and means adjustably engaging said slot for securing said cheek-plate.

4. In a dental dam holder, a cheek-plate formed of a sheet-metal stamping having a slot provided with a series of notches, said slot being substantially parallel to one edge thereof, and means adjustably engaging said slot and notches for securing said cheek-plate.

In testimony whereof I affix my signature in presence of two witnesses.

CLARENCE A. HOLMES.

Witnesses:
HERCHMER JOHNSTON,
WILLIAM A. QUINLAN.

Copies of this patent may be obtained for five cents each, by addressing the "Commissioner of Patents, Washington, D. C."